United States Patent
Wu

[11] Patent Number: 5,199,322
[45] Date of Patent: Apr. 6, 1993

[54] HANDLEBAR ASSEMBLY FOR CYCLES

[76] Inventor: Meng-Liang Wu, No. 370, Sec. 4, Yuan Lu Rd., Hsi Fu Chen, Chang Hua Hsien, Taiwan

[21] Appl. No.: 853,497

[22] Filed: Mar. 18, 1992

[51] Int. Cl.$^5$ ............... B62K 21/12; B62K 21/16; F16B 7/00
[52] U.S. Cl. ................. 74/551.1; 74/551.3; 74/551.7; 403/292
[58] Field of Search ............ 403/292, 349, 379; 74/551.1, 551.3, 551.4, 551.5, 551.7, 551.8

[56] References Cited

U.S. PATENT DOCUMENTS

| | | | |
|---|---|---|---|
| 582,902 | 5/1897 | Dieterich | 74/551.7 |
| 597,001 | 1/1898 | Ingraham | 74/551.7 |
| 602,095 | 4/1898 | Newell | 74/551.7 |
| 610,736 | 9/1898 | Dieterich | 74/551.7 |
| 613,633 | 11/1898 | King et al. | 74/551.7 |
| 619,126 | 2/1899 | Blashfield | 74/551.4 |
| 1,068,158 | 7/1913 | Noack | 74/551.7 |
| 3,505,901 | 4/1970 | Stone | 74/551.4 |
| 3,655,219 | 4/1972 | Jacoby | 74/551.6 |
| 4,417,745 | 11/1983 | Shomo | 74/551.3 |
| 4,557,467 | 12/1985 | Lin | 403/292 X |
| 4,873,886 | 10/1989 | Renner | 74/551.1 X |
| 4,939,950 | 7/1990 | Girvin | 74/551.2 |
| 5,033,325 | 7/1991 | Giard | 74/551.3 |
| 5,078,534 | 1/1992 | White | 403/292 |

FOREIGN PATENT DOCUMENTS

| | | | |
|---|---|---|---|
| 10888 | 5/1899 | Sweden | 74/551.6 |
| 3651 | of 1898 | United Kingdom | 74/551.4 |
| 13899 | of 1910 | United Kingdom | 74/551.6 |

Primary Examiner—Vinh T. Luong
Attorney, Agent, or Firm—Bell, Seltzer, Park & Gibson

[57] ABSTRACT

A handlebar structure including a sleeve formed on a stem, a handlebar including two halves each including a free end engaged on a coupler and engaged in the sleeve, two stubs formed on one end of the coupler, two slots formed on the free end of one half of the handlebar and engaged with the stubs when the half of the handlebar is engaged on the coupler, whereby, the handlebar is easily secured to the sleeve.

7 Claims, 3 Drawing Sheets

1

HANDLEBAR ASSEMBLY FOR CYCLES

BACKGROUND OF THE INVENTION

1. Field of the Invention

The present invention relates to a handlebar, and more particularly to a handlebar assembly for cycles.

2. Description of the Prior Art

One type of handlebar assembly is disclosed in U.S. Pat. No. 4,939,950 to Girvin, filed Oct. 24, 1988, entitled "HANDLEBAR ASSEMBLY FOR CYCLES". In this assembly, the handlebar element 24 includes a tubular main portion 60 secured in the tubular front sleeve 44 by such as bolts and nuts.

The tubular main portion 60 should be forced into the tubular front sleeve 44 from one end thereof such that the tubular main portion 60 can be secured in the tubular front sleeve 44. This is inconvenient. In addition, the gripping portions 62 can be fixed in place only after the tubular main portion 60 has been forced into the tubular front sleeve 44. This further causes inconvenience for assembling purposes.

The present invention has arisen to mitigate and/or obviate the afore-described disadvantages of the conventional handlebar assembly.

SUMMARY OF THE INVENTION

The primary objective of the present invention is to provide a handlebar assembly which can be easily assembled.

In accordance with one aspect of the invention, there is provided a handlebar assembly comprising a stem having a sleeve formed integral thereon, a handlebar including a first half and a second half each including a free end engaged in the sleeve, a coupler including two end portions, the free end of the first half of the handlebar engaged on a first end portion of the coupler, a first engaging means formed on a second end portion of the coupler, a second engaging means formed on the free end of the second half of the handlebar and engaged with the first engaging means when the free end of the second half is engaged on the second end portion of the coupler, whereby, the handlebar is easily secured to the sleeve.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
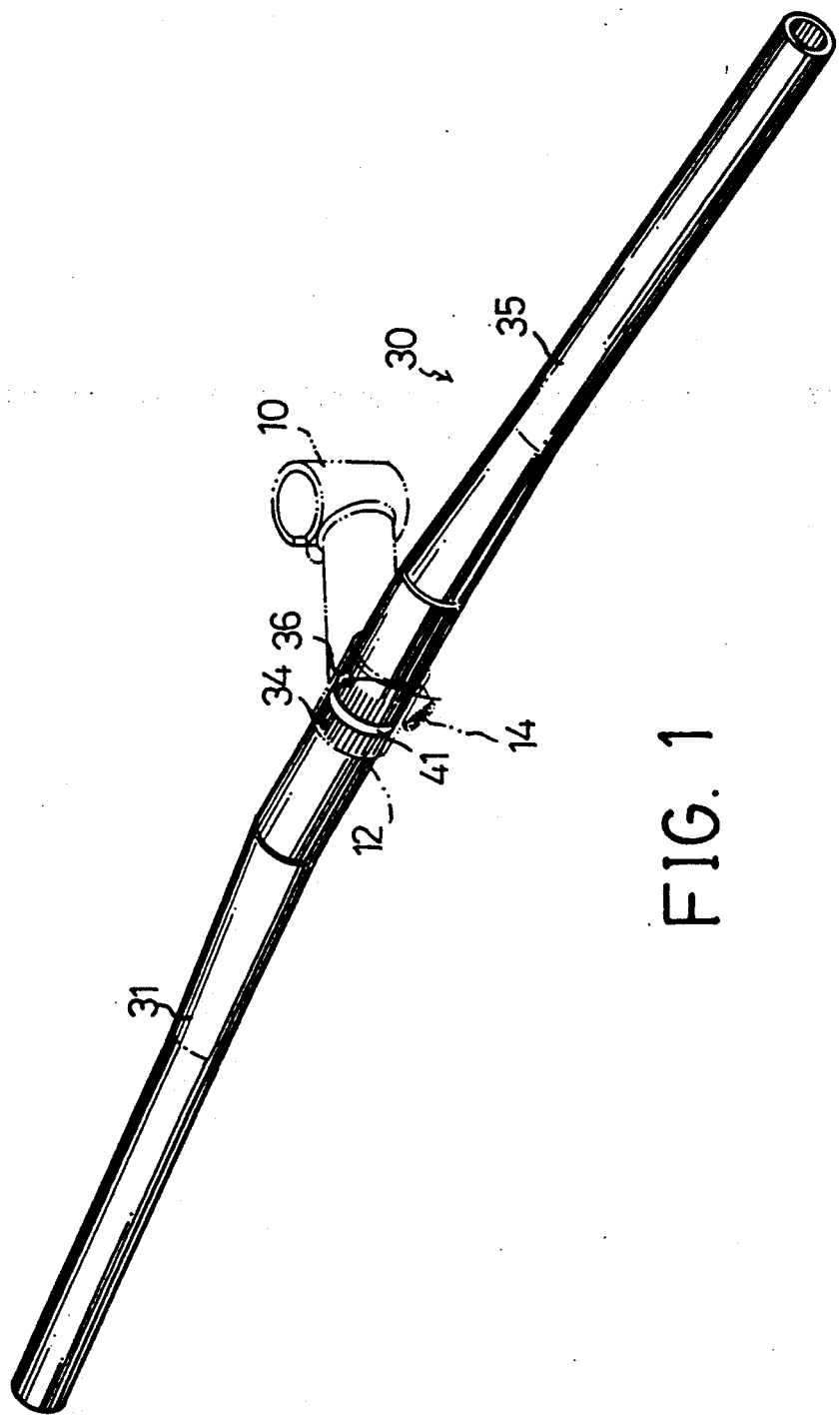
FIG 1 is a perspective view of a handlebar assembly in accordance with the present invention.

Referring to the drawings, and initially to FIG. 1, a handlebar assembly in accordance with the present invention comprises generally a stem 10 having a shank 11 extended forward therefrom, a sleeve 12 formed integral on the front end of the shank 11, and a handlebar 30 laterally received and secured in the sleeve 12 by such as a bolt 14.

Figure 2:
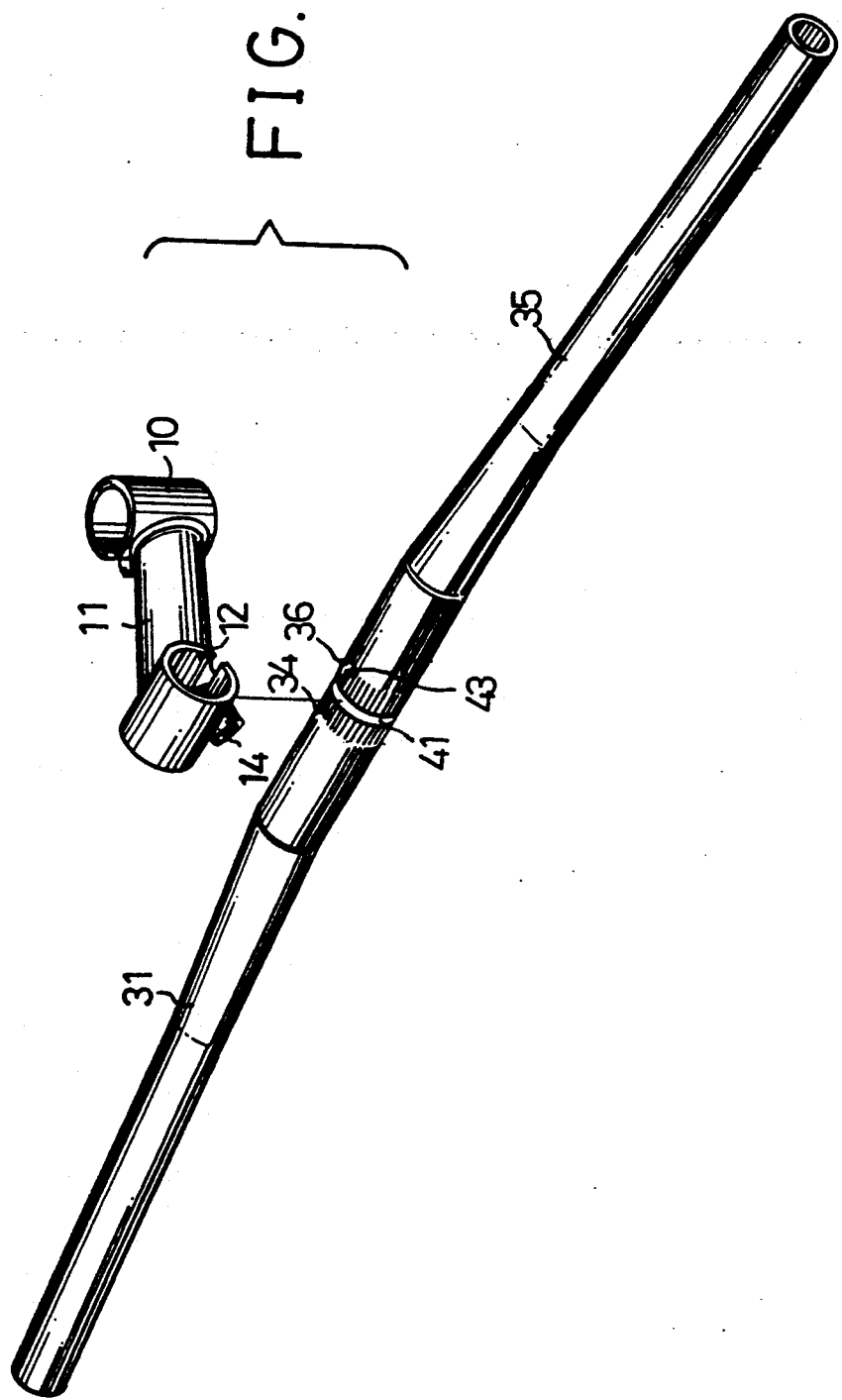
FIG. 2 is a partial exploded view of the handlebar assembly.
Figure 3:
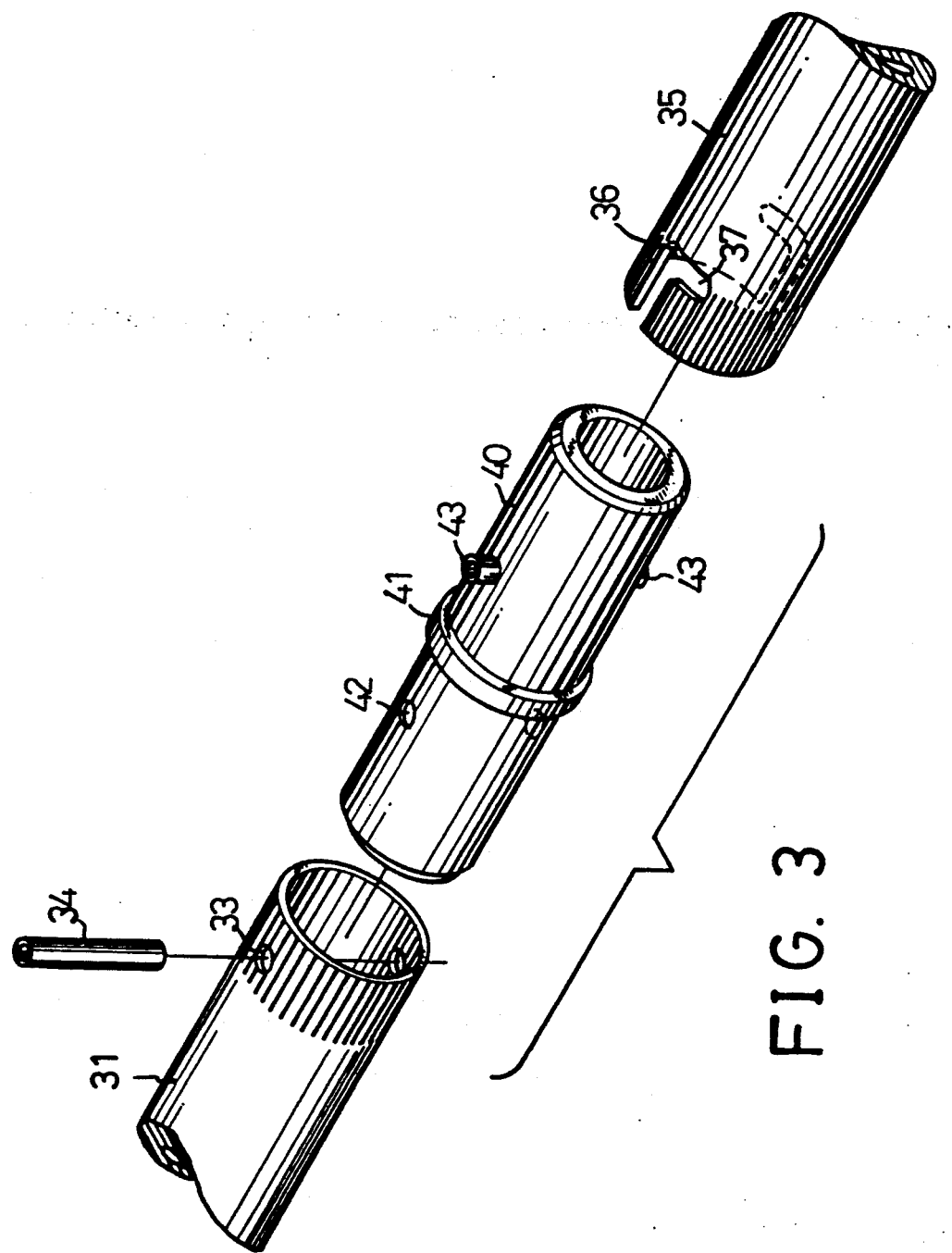
FIG. 3 is a partial exploded view of the handlebar assembly illustrating the detailed structure thereof.

Referring next to FIGS. 2 and 3, the handlebar 30 includes two halves 31, 35 coupled together by a coupler 40. The coupler 40 includes an annular rib 41 formed in the middle portion thereof, two holes 42 oppositely formed in the coupler 40 and located in one side of the annular rib 41, and two stubs 43 oppositely formed in the coupler 40 and located in the other side of the annular rib 41. The first half 31 of the handlebar 30 includes two openings 33 oppositely formed therein and aligned with the holes 42 of the coupler 40. A pin 34 is engaged through the holes 42 and openings 33 such that the first half 31 of the handlebar 30 can be coupled to one of the end portions of the coupler 40. The second half 35 includes a pair of L-shaped slots 36 oppositely formed in the free end thereof and each having a dead end 37. When the second half 35 is engaged on the other end portion of the coupler 40, the stubs 43 are engaged in the slots 36, and the stubs 43 are engaged in the dead ends of the slots 36 when the second half 35 is rotated relative to the coupler 40.

In assembling operation of the handlebar, the first half 31 of the handlebar 30 is first coupled to the coupler 40. The coupler 40 is then inserted into the sleeve 12. The second half 35 is then engaged onto the coupler 40 and rotated such that the stubs 43 are engaged in the dead ends of the slots 36. The sleeve 12 is then locked by the bolt 14 such that the handlebar 30 can be easily assembled. It is to be noted that the coupler 40 can be easily inserted into the sleeve 12.

Accordingly, the handlebar 30 of the handlebar assembly in accordance with the present invention can be easily assembled and secured in the sleeve 12.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A handlebar assembly comprising a stem having a sleeve fixed thereon, a handlebar including a first half and a second half each including a free end engaged in said sleeve, a coupler including two end portions, said free end of said first half of said handlebar engaged on a first end portion of said coupler, a first engaging means including a pair of stubs oppositely formed on said second end portion of said coupler, a second engaging means including a pair of slots formed in said free end of said second half of said handlebar and engaged with said stubs of said first engaging means when said free end of said second half is engaged on said second end portion of said coupler, each of said slots being L-shaped, whereby, said second half of said handlebar is coupled to said coupler, and said handlebar is easily secured to said sleeve.

2. A handlebar assembly according to claim 1, wherein said first end portion of said coupler includes two holes oppositely formed therein, said free end of said first half of said handlebar includes two openings oppositely formed therein and aligned with said holes of said coupler, and a pin is engaged in said holes of said coupler and said openings of said first half of said handlebar such that said first half of said handlebar is coupled to said coupler.

3. A handlebar assembly according to claim 1, wherein said coupler includes an annular rib fixed on a middle portion thereof and engaged between said free ends of said first half and said second half of said handlebar.

4. A handlebar assembly comprising a stem having a sleeve fixed thereon, a handlebar including a first half and a second half each including a free end engaged in said sleeve, a coupler including two end portions having two holes oppositely formed in a first end portion thereof, said free end of said first half of said handlebar including two openings oppositely formed thereon and aligned with said holes of said coupler, a pin engaged in said holes of said coupler and said openings of said first half of said handlebar such that said first half of said handlebar is coupled to said first end portion of said coupler, a first engaging means including a pair of stubs oppositely formed on said second end portion of said coupler, a second engaging means including a pair of slots formed in said free end of said second half of said handlebar and engaged with said stubs of said first engaging means when said free end of said second half is engaged on said second end portion of said coupler, each of said slots being L-shaped, whereby, said second half of said handlebar is coupled to said coupler, and said handlebar is easily secured to said sleeve.

5. A handlebar assembly comprising a stem having a sleeve fixed thereon, a handlebar including a first half and a second half each including a free end engaged in said sleeve, a coupler including two end portions, said free end of said first half of said handlebar engaged on a first end portion of said coupler, a pair of stubs formed on a second end portion of said coupler, a pair of slots formed in said free end of said second half of said handlebar and engaged with said stubs of said coupler when said free end of said second half is engaged on said second end portion of said coupler such that said second half of said handlebar is coupled to said coupler, each of said slots being L-shaped, whereby, said handlebar is easily secured to said sleeve.

6. A handlebar assembly according to claim 5, wherein said first end portion of said coupler includes two holes oppositely formed therein, said free end of said first half of said handlebar includes two openings oppositely formed therein and aligned with said holes of said coupler, and a pin is engaged in said holes of said coupler and said openings of said first half of said handlebar such that said first half of said handlebar is coupled to said coupler.

7. A handlebar assembly according to claim 5 wherein said sleeve includes a longitudinal slit, and further comprising bolt means for closing said slit to secure said sleeve to said free ends of said first and second halves of said handlebar.

* * * * *